(12) United States Patent
Zhu et al.

(10) Patent No.: US 12,525,376 B2
(45) Date of Patent: Jan. 13, 2026

(54) PREPARATION METHOD OF AN INSULATED WIRE

(71) Applicant: WELL ASCENT ELECTRONIC (GANZHOU) CO., LTD., Ganzhou (CN)

(72) Inventors: Yuejia Zhu, Ganzhou (CN); Zuomao Zhu, Ganzhou (CN); Huimin Ye, Ganzhou (CN)

(73) Assignee: WELL ASCENT ELECTRONIC (GANZHOU) CO., LTD., Jiangxi (CN)

( * ) Notice: Subject to any disclaimer, the term of this patent is extended or adjusted under 35 U.S.C. 154(b) by 0 days.

(21) Appl. No.: 19/016,514

(22) Filed: Jan. 10, 2025

(65) Prior Publication Data
US 2026/0004956 A1    Jan. 1, 2026

(30) Foreign Application Priority Data
Jun. 28, 2024    (CN) .......................... 202410851553.1

(51) Int. Cl.
*H01B 13/14*    (2006.01)
*H01B 3/30*    (2006.01)
(Continued)

(52) U.S. Cl.
CPC .......... *H01B 13/145* (2013.01); *H01B 3/305* (2013.01); *H01B 3/306* (2013.01); *H01B 13/002* (2013.01);
(Continued)

(58) Field of Classification Search
CPC ........ H01B 3/303; H01B 3/305; H01B 3/306; H01B 13/002; H01B 13/145;
(Continued)

(56) References Cited

U.S. PATENT DOCUMENTS

| | | | | |
|---|---|---|---|---|
| 4,588,546 A | * | 5/1986 | Feil ........................ | H01B 13/14 264/510 |
| 2020/0328009 A1 | * | 10/2020 | Tachibana .............. | H01B 3/305 |

FOREIGN PATENT DOCUMENTS

| | | |
|---|---|---|
| CN | 104170024 A | 11/2014 |
| CN | 110845859 A | 2/2020 |

(Continued)

OTHER PUBLICATIONS

Santos Lima et al, "Characterization of Classical and Extruded Enamelled Wires", 2023 INSUCON—14th International Electrical Insulation Conference; May 2023. (Year: 2023).*

(Continued)

*Primary Examiner* — A. Dexter Tugbang
(74) *Attorney, Agent, or Firm* — BCF LLP

(57) ABSTRACT

An insulated wire and a preparation method therefor, a coil, and an electronic/electrical device are provided. In the preparation method, the thermoplastic polyimide is extruded to mold by adopting the extrusion process, so as to form the insulating layer on the core material, which can significantly improve the production efficiency compared to the traditional multiple-time coating process. The preparation process of the bonding layer and the extrusion process are optimized; the bonding layer is prepared by a specific bonding layer formulation; and then the insulating layer is extruded under a specific negative pressure, so that the prepared thermoplastic polyimide insulating layer has fewer bubbles, and the size of the bubbles is smaller, which ensures the insulating layer to have a higher breakdown voltage.

9 Claims, 1 Drawing Sheet

(51) Int. Cl.
  *H01B 13/00*   (2006.01)
  *H01B 13/30*   (2006.01)
  *H01F 5/06*    (2006.01)
(52) U.S. Cl.
  CPC ......... *H01B 13/146* (2013.01); *H01B 13/148* (2013.01); *H01B 13/30* (2013.01); *H01F 5/06* (2013.01)
(58) Field of Classification Search
  CPC .... H01B 13/146; H01B 13/148; H01B 13/30; H01B 13/14; H01F 5/06
  See application file for complete search history.

(56)    References Cited

FOREIGN PATENT DOCUMENTS

| | | | |
|---|---|---|---|
| JP | 2011150823 A |   | 8/2011 |
| JP | 2015138626 A |   | 7/2015 |
| JP | 2017059312 A | * | 3/2017 |
| WO | 2011106581 A1 |   | 9/2011 |
| WO | 2016039351 A1 |   | 3/2016 |

OTHER PUBLICATIONS

Notification to Grant with regard to the CN Patent Application No. CN 2024108515531 issued Aug. 30, 2024.
Office Action with regard to the CN Patent Application No. CN 2024108515531 dated Aug. 19, 2024.

* cited by examiner

U.S. Patent  Jan. 13, 2026  US 12,525,376 B2
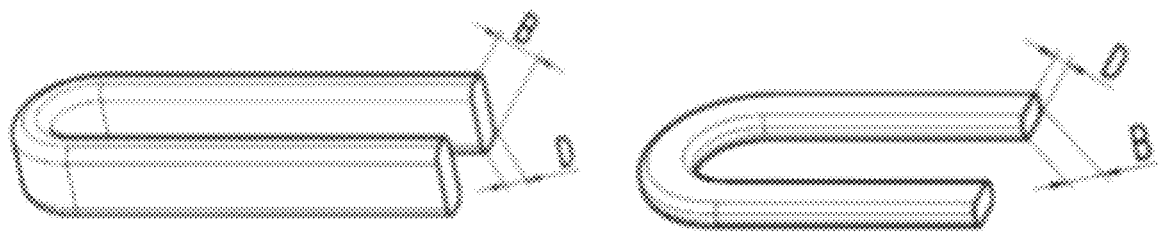

PREPARATION METHOD OF AN INSULATED WIRE

CROSS-REFERENCE TO RELATED APPLICATION

The present disclosure claims the priority to the Chinese patent application with the filling No. CN2024108515531 filed with the Chinese Patent Office on Jun. 28, 2024, and entitled "INSULATED WIRE AND PREPARATION METHOD THEREFOR, COIL, AND ELECTRONIC/ELECTRICAL DEVICE", the contents of which are incorporated herein by reference in entirety.

TECHNICAL FIELD

The present disclosure relates to the technical field of electrochemical components, and specifically to an insulated wire and a preparation method therefor, a coil, and an electronic/electrical device.

BACKGROUND ART

The insulated wires are needed in many electronic devices. At present, the production method of the insulated wire is mainly to coat an insulating layer on the conductor, wherein the insulating layer is formed by the process of multiple times of coating and baking to curing, and some materials of insulating layers can also be molded by adopting the extrusion process. When polyimide is taken as an insulating material, the process of multiple times of coating and curing is often used. The process needs to perform multiple times of coating and curing, wherein the operation is cumbersome and the production efficiency is low, and it is easy to produce the waste gas, which leads to the environmental pollution. The innermost layer is baked for many times, so that it is easy to lead to aging and the adhesion decrease.

The one-time extrusion process is easy to operate and can significantly improve the production efficiency. However, thermoplastic polyimide (TPI) has a poor thermal stability, and it is easily cracked and decomposed to produce bubbles during the extruding process, which reduces the breakdown voltage of the insulating layer, thereby affecting the service life of the insulated wires.

In view of this, the present disclosure is proposed.

SUMMARY

One object of the present disclosure is to provide an insulated wire and a preparation method therefor for significantly reducing the sizes and the contents of bubbles in the insulating layer of the thermoplastic polyimide insulated wire, so as to improve a breakdown voltage of the insulating layer.

The other object of the present disclosure is to provide a coil and an electronic/electrical device for improving the service life of the product.

The present disclosure is realized in the following ways.

In a first aspect, the present disclosure provides a preparation method for the insulated wire, including:

preparing a core material: forming a bonding layer on a conductor, wherein a process of forming the bonding layer includes: mixing polyamide-imide, polyimide, and organic solvent to obtain a bonding-layer mixed liquid, and performing coating and curing multiple times on the conductor by using the bonding-layer mixed liquid, wherein in mass percentage, the bonding-layer mixed liquid includes: the polyamide-imide 20%-30%, the polyimide 1%-3%, and the organic solvent 67%-79%; and preparing an insulating layer: vacuuming an extruder, and melting and extruding the thermoplastic polyimide at an outer side of the core material after preheating, so as to form a thermoplastic polyimide insulating layer, wherein the extruding process is carried out under a negative pressure condition; and a vacuum suction for applying the negative pressure is controlled to be larger than or equal to 0.3 MPa; a preheating temperature is controlled to be 200° C.-320° C.; and an extruding temperature is 370° C.-410° C.

In an optional embodiment, the thermoplastic polyimide particle is added to the extruder after the extruder is vacuumed first; it is melted and extruded at 370° C.-410° C.; it is held at 260° C.-280° C. for 10 s-30 s after extruding; and then it is cooled.

In an optional embodiment, a vacuuming duration of the extruder is controlled to be 30 min-120 min, and a volume fraction of oxygen in the extruder after vacuumed is smaller than or equal to 3%.

In an optional embodiment, after drying, the thermoplastic polyimide particles are fed into the extruder under a sealing condition, wherein
- a particle size of the thermoplastic polyimide particle is 1 mm-3 mm, and
- a glass transition temperature of the polyimide in the bonding layer is larger than a glass transition temperature of the thermoplastic polyimide in the insulating layer, wherein the glass transition temperature of the polyimide in the bonding layer is 315° C.-335° C., and the glass transition temperature of the thermoplastic polyimide in the insulating layer is 235° C.-255° C.

In an optional embodiment, the preheating is to heat the core material by adopting a high-frequency induction heating method in an inert gas, wherein a heating power is controlled to be 4500 W-5500 W, and a frequency is 90 kHz-100 kHz.

In an optional embodiment, a curing temperature is controlled to be 250° C.-450° C. after each coating, and a solvent content is controlled to be smaller than 200 ppm after curing.

In an optional embodiment, a thickness of a coating film formed after each coating and curing is controlled to be 2 μm-4 μm, and a thickness of a final formed bonding layer is 5 μm-30 μm.

In an optional embodiment, the ratio of the thickness of the bonding layer to a thickness of the insulating layer is 1:(10-20).

In an optional embodiment, a section of the conductor is rectangular, and the thickness of the insulating layer is 50 μm-300 μm.

In an optional embodiment, a material of the conductor is selected from at least one of copper, aluminum, copper alloy, and aluminum alloy.

In a second aspect, the present disclosure further provides an insulated wire prepared by the preparation method in any of the foregoing embodiments, wherein the insulated wire includes the core material and the insulating layer coating the core material; the core material includes the conductor; and the insulating layer is formed by the thermoplastic polyimide.

In an optional embodiment, in the insulating layer, no more than one bubble with a diameter larger than 30 μm exists per 100 meters, and a maximum diameter of the bubbles is smaller than or equal to 50 μm, wherein the diameter of each of the bubbles is a maximum value of a width of its vertical projection on a closest wire surface; and in the insulating layer, spacing between two adjacent bubbles is larger than 100 m.

In an optional embodiment, when the insulating layer is stretched by 20% at a rate of 300 mm/min, a length of the insulating layer losing adhesion is not larger than 1 times a width of the conductor.

In an optional embodiment, when the thickness of the insulating layer is 100 μm-120 μm; a corresponding breakdown voltage is 12 KV-14 KV; when the thickness of the insulating layer is 120 μm-140 μm, the corresponding breakdown voltage is 14 KV-16 KV; and when the thickness of the insulating layer is larger than 140 μm, the corresponding breakdown voltage is larger than 16 KV.

In a third aspect, the present disclosure provides a coil, including the insulated wire according to any one of the foregoing embodiments or the insulated wire prepared by the preparation method according to any one of the foregoing embodiments.

In a fourth aspect, the present disclosure provides an electronic/electrical device, including the coil of the foregoing embodiments.

The present disclosure includes the following beneficial effects. In the preparation method provided by the present disclosure, the thermoplastic polyimide is extruded to mold by adopting the extrusion process, so as to form the insulating layer on the core material, which can significantly improve the production efficiency compared to the traditional multiple-time coating process. The preparation process of the bonding layer and the extrusion process of the insulating layer are optimized; the bonding layer is prepared by a specific bonding layer formulation; and then the insulating layer is extruded under a specific negative pressure, so that the prepared thermoplastic polyimide insulating layer has fewer bubbles, and the size of the bubbles is smaller, which ensures the insulating layer to have a higher breakdown voltage.

It needs to be added that when adopting the traditional extrusion process, the thermoplastic polyimide produces more gas during the extruding process, which produces larger and more bubbles in the insulating layer, which will lead to a decrease of the breakdown voltage in the insulating layer, thereby affecting the life of the insulated wire.

BRIEF DESCRIPTION OF DRAWINGS

In order to more clearly illustrate the technical solutions of the embodiments of the present disclosure, the drawings to be used in the embodiments will be briefly introduced below. It should be understood that the following drawings only show certain embodiments of the present disclosure, and therefore should not be regarded as a limitation of the scope. Other relevant drawings can be obtained from these drawings by a person of ordinary skill in the art without inventive efforts.

FIG. 1 shows a schematic diagram of a test method for the bending processability test of the present disclosure.

DETAILED DESCRIPTION OF EMBODIMENTS

In order to make the purpose, technical solutions, and advantages of the embodiments of the present disclosure clearer, the technical solutions in the embodiments of the present disclosure will be described clearly and completely below. Where specific conditions are not indicated in the embodiments, they shall be performed based on the usual conditions or those recommended by manufacturers. The reagents or instruments used without indication of the manufacturers are conventional products that can be purchased commercially.

The thermoplastic polyimide is easily cracked and decomposed to produce bubbles in the extrusion process due to its poor thermal stability. If the insulating layer produces more bubbles, the breakdown resistance of the insulating layer will be affected; and the insulating layer is easily broken down, thereby affecting the service life of the insulated wire.

The inventors creatively optimized the extrusion process of the thermoplastic polyimide, so that the thermoplastic polyimide can be extruded and molded under the premise without producing a large amount of bubbles, which can significantly shorten the production cycle compared to the traditional process of multiple times of coating and baking.

The embodiment of the present disclosure provides a preparation method for an insulated wire, including the following steps.

S1, preparing the material.

The conductor is prepared. The conductor can be a common conductor used for electric wires, wherein the specific material and shape are not limited, and can be selected according to the specific application scenarios.

In some embodiment, the material of the conductor is selected from at least one of copper, aluminum, copper alloy, and aluminum alloy. The material of the conductor can be any one or more of the above, preferably a copper conductor.

In some embodiments, a section of the conductor is rectangular, and the size of the conductor is not limited and depends on the application environment.

In some embodiments, a plasma treatment can be performed on the conductor. The wire surface is treated by using the plasma during a continuous movement process of the conductor, wherein a movement speed of the wire is 8-15 m/min, and the gas used in the plasma process is at least one of argon and nitrogen. In the plasma process, a spray angle of the plasma is 60-90°, wherein the spray angle of the plasma is an angle between a spray path of the plasma and a center axis of the wire. The energy density of the plasma process is 3-12 A/cm$^2$; the processing duration is 0.04-0.8 s; the frequency is 40-60 HZ; the pulse voltage is 220-230V; and the current is 1 A-15 A.

S2, forming the bonding layer.

In order to improve the adhesion between the conductor and the insulating layer, the bonding layer is formed between the conductor and the insulating layer, wherein the material of the bonding layer is not limited, and it only needs to improve the adhesion between the conductor and the insulating layer.

In some embodiments, the process of forming the bonding layer includes: mixing polyamide-imide, polyimide, and organic solvent to obtain the bonding-layer mixed liquid, and performing coating and curing multiple times on the conductor by using the bonding-layer mixed liquid, so as to form the bonding layer with a thickness meeting the requirement by multiple times of coating and curing.

Specifically, the coating and curing can be performed 3, 4, 5, or more times. During the process of forming the bonding layer, a layer of the bonding-layer mixed liquid is coated on the conductor; then it is heated and cured; then a layer of the bonding-layer mixed liquid is coated again; and then it is coated and cured, by analogy, until the thickness of the bonding layer meets the requirements.

In some embodiments, a thickness of a coating film formed after each coating and curing is controlled to be 2

μm-4 μm, and a thickness of a final formed bonding layer is 5 μm-30 μm. The curing temperature after each coating is controlled to be 250° C.-450° C., and the curing duration is regulated so that the solvent content after curing is smaller than 200 ppm. By optimizing process parameters of the coating and curing, the adhesion of the bonding layer is ensured, so as to prevent over-curing, which affects the adhesion strength of the bonding layer to the insulating layer and the conductor. If the curing temperature is too high and the curing duration is too long, the innermost layer is easy to age after multiple times of baking, which affects the adhesion of the insulating layer; and if the curing temperature is too low and the curing duration is too short, the solvent is easily not sufficiently removed, and the product does not reach the standard.

Specifically, the thickness of each coating can be 2.0 μm, 2.3 μm, 2.5 μm, 2.8 μm, and 3.0 μm, etc., and the total coating thickness can be 5 μm, 10 μm, 15 μm, 20 μm, 25 μm, and 30 μm, etc. The curing temperature after each coating can be controlled to be 250° C., 300° C., 350° C., 400° C., and 450° C., etc.

In some embodiments, in mass percentage, the bonding-layer mixed liquid includes: the polyamide-imide 20%-30%, the polyimide 1%-3%, and the organic solvent 67%-79%. By regulating the amount of solvent, the solid content of the bonding-layer mixed liquid at 20° C. is more suitable. The viscosity is 5000 cp~6000 cp, it can be rapidly cured and molded after heating. By regulating the amount of each component, the adhesion between the bonding layer and the insulating layer is further improved, so as to prevent the insulated wire from cracking and stripping.

Specifically, the mass percentage of the polyamide-imide can be 20%, 23%, 25%, 28%, and 30%, etc. The mass percentage of the polyimide can be 1%, 2%, and 3%, etc. The mass percentage of the organic solvent can be 67%, 70%, 73%, 75%, and 79%, etc. The solid content of the bonding-layer mixed liquid can be 20%, 21%, 22%, 23%, 24%, and 25%, etc.

The type of organic solvent is not limited, as long as it can effectively dissolve polyamide-imide, polyimide. It can specifically be at least one of amide-based solvents, urea-based solvents, lactone-based solvents, carbonate-based solvents, ketone-based solvents, ester-based solvents, glycol dimethyl ether-based solvents, hydrocarbon-based solvents, phenol-based solvents, and sulfone-based solvents.

Specifically, amide-based solvents can include N,N-dimethylacetamide (DMAC), N,N-dimethylformamide (DMF), etc.; urea-based solvents can include N,N-dimethylvinylurea, N,N-dimethylpropyleneurea, tetramethylurea, etc.; lactone-based solvents can include γ-butyrolactone, γ-caprolactone, etc.; carbonate-based solvents can include propylene carbonate, but are not limited to this; ketone-based solvents can include methyl ethyl ketone, methyl isobutyl ketone, cyclohexanone, etc.; ester-based solvents can include ethyl acetate, n-butyl acetate, butyl cellosolve acetate, butyl carbitol acetate, ethyl cellosolve acetate, ethyl carbitol acetate, etc.; glycol dimethyl ether-based solvents can include diglycol dimethyl ether, triglycol dimethyl ether, tetraglycol dimethyl ether, etc.; hydrocarbon-based solvents can include toluene, xylene, cyclohexane, etc.; phenol-based solvents can include methylphenol, phenol, halogenated phenol, etc.; and sulfone-based solvents can include cyclobutyl sulfone, dimethyl sulfone (DMSO), etc.

S3, forming the thermoplastic polyimide insulating layer.

The thermoplastic polyimide is melted and extruded at the outer side of the core material, so as to form the thermoplastic polyimide insulating layer, which is easy to operate. Compared to the traditional coating and curing process, it can significantly shorten the production cycle.

The conventional extrusion process results in larger and more bubbles in the thermoplastic polyimide insulating layer, which affects the breakdown resistance of the insulating layer. The inventors have optimized the extrusion process, so that the formed thermoplastic polyimide insulating layer has advantages of fewer bubbles and smaller bubbles. The extrusion process is as follows. The core material is preheated to 200~320° C. first; the thermoplastic polyimide particle is added to the extruder after the extruder is vacuumed; it is melted and extruded at 370° C.-410° C.; it is held at 260° C.-280° C. for 10 s-30 s after extruding under a negative pressure condition; and then it is cooled, wherein a vacuum suction for applying the negative pressure is controlled to be larger than or equal to 0.3 MPa.

The bonding layer can be softened by preheating the core material, so that the bonding layer is in a high elastic state. When the extruded TPI is in contact with the bonding layer, the bonding layer and the extruded TPI are merged. Since PI exists in the bonding layer, and the PI and the TPI are similar and soluble, the bonding property between the bonding layer and the TPI is improved. The extruder is vacuumed first to reduce the contact of oxygen with the material, which avoids the material from reacting with the oxygen to produce small molecule gases, and also provides negative pressure, so that the gas is discharged rapidly. By optimizing the range of the negative pressure, the thermoplastic polyimide can be smoothly extruded, and the bubble content in the insulating layer can be minimized. If the negative pressure is too large, the thermoplastic polyimide cannot be smoothly extruded; and if the negative pressure is too small, the gas cannot be discharged rapidly, which will increase the bubble content in the insulating layer.

Specifically, the preheating temperature of the core material can be 200° C., 220° C., 240° C., 260° C., 280° C., 300° C., and 320° C., etc. The extruding temperature can be 370° C., 380° C., 390° C., 400° C., and 410° C., etc. The holding duration after extruding can be 10 s, 15 s, 20 s, 25 s, and 30 s, etc. The holding temperature can be 260° C., 270° C., and 280° C., etc.

It needs to be added that the extruding temperature should be larger than the melting point of the thermoplastic polyimide, and the melting points of the thermoplastic polyimide of different manufacturers are slightly different. The thermoplastic polyimide provided in specific embodiments of the present disclosure has a melting point of 388° C., but when the melting point of the thermoplastic polyimide is smaller than 370° C., the extruding temperature of 370° C. can be adopted.

In some embodiments, the vacuuming duration of the extruder is controlled to be 30 min-120 min, and the content of oxygen in the extruder after vacuumed is smaller than or equal to 3% (volume percentage). By regulating the vacuuming duration, the gas in the extruder is more fully discharged, so as to prevent the oxygen from interfering with the extrusion process, and to prevent the carbonization of material and the thermal acid deterioration. Specifically, the vacuuming duration can be 30 min, 50 min, 80 min, 100 min, 120 min, etc.

In some embodiments, the preheating is to heat the core material by adopting a high-frequency induction heating method in an inert gas, wherein a heating power is controlled to be 4500 W-5500 W, and a frequency is 90 kHz-100 kHz. The high-frequency induction heating heats from the conductor inside the core material, and its heating is more uniform. Therefore, the heat conduction path from the inside to the outside can be realized and the rapid preheating can be realized, so as to shorten the process duration. In addition, the heat transfer medium and the flowing heat transfer medium promoting the heat conduction are not required to additionally add, it can reduce the contact of oxygen and water in the air with the core material. Specifically, the inert gas can be nitrogen, and argon, etc., but it is not limited thereto. Specifically, when preheating the core material by using the high-frequency induction heating method, the heating power can be controlled to be 4500 W, 5000 W, and 5500 W, etc., and the frequency can be 90 kHz, 92 kHz, 96 kHz, 98 kHz, and 100 kHz, etc.

In some embodiments, after drying, the thermoplastic polyimide particle enters into the extruder under the sealing condition, wherein the drying process can be carried out in a vacuum drying oven. The water content in the raw material can be reduced by drying, which is conducive to further reducing the generation of bubbles later. After the drying is complete, it is transferred to the extruder under the sealing condition, and it needs to prevent the introduction of oxygen during the transfer process.

Further, the particle size of the thermoplastic polyimide particle is 1 mm-3 mm. The thickness of the insulating layer is 50 μm-300 μm by regulating the amount of the thermoplastic polyimide particle, so that the insulating layer can protect the core material better. Specifically, the particle size of the thermoplastic polyimide particle can be 1 mm, 2 mm, and 3 mm, etc.

The embodiment of the present disclosure provides an insulated wire, including the core material and the insulating layer coating on the core material; the core material includes the conductor; and the insulating layer is formed by the thermoplastic polyimide. In the insulating layer, no more than one bubble with a diameter larger than 30 μm exists per 100 meters, and a maximum diameter of the bubbles is smaller than or equal to 50 μm, wherein the diameter of each of the bubbles is a maximum value of a width of its vertical projection on the closest wire surface. The insulated wire provided by the embodiment of the present disclosure has few bubbles in the insulating layer and the bubbles are small, so that the insulating layer has a higher breakdown voltage and the service life of the insulated wire is improved.

It needs to be noted that the bubble in the insulating layer is not a spherical bubble.

In some embodiments, in the insulating layer, spacing between two adjacent bubbles is larger than 100 m. The spacing of the bubbles is very large, and the distribution of bubbles is not dense. When the insulating layer is stretched by 20% at a rate of 300 mm/min, a length of the insulating layer losing adhesion is not larger than 1 times a width of the conductor.

The insulating layer is easily broken down at positions of bubbles due to the existence of the bubbles. The insulated wire provided by the embodiment of the present disclosure has few bubbles in the insulating layer and their sizes are small, which can improve the breakdown voltage of the insulating layer, and the adhesion of the insulating layer is larger. When the thickness of the insulating layer is 100 μm-120 μm; the corresponding breakdown voltage is 12 KV-14 KV; when the thickness of the insulating layer is 120 μm-140 μm, the corresponding breakdown voltage is 14 KV-16 KV; and when the thickness of the insulating layer is larger than 140 μm, the corresponding breakdown voltage is larger than 16 KV.

In some embodiments, the core material further includes the bonding layer coated on the conductor, and the bonding layer has polyimide. The adhesion between the conductor and the insulating layer can be improved by introducing the bonding layer, so that the insulating layer is less easily cracked and stripped.

In some embodiments, the bonding layer is formed by the polyamide-imide and the polyimide, wherein a mass ratio of the polyamide-imide and the polyimide is (8-30):1. By optimizing the mass ratio of the polyamide-imide and the polyimide, the bonding effect between the bonding layer and the insulating layer can be further improved. Specifically, the mass ratio of the polyamide-imide and the thermoplastic polyimide can be 8:1, 10:1, 13:1, 15:1, 18:1, 20:1, 23:1, 25:1, 28:1, and 30:1, etc. A glass transition temperature of the polyimide in the bonding layer is larger than a glass transition temperature of the thermoplastic polyimide in the insulating layer, wherein the glass transition temperature of the polyimide in the bonding layer is 315° C.-335° C., and the glass transition temperature of the thermoplastic polyimide in the insulating layer is 235° C.-255° C.

In some embodiments, the ratio of the thickness of the bonding layer to the thickness of the insulating layer is 1:(10-20), such as 1:10, 1:13, 1:15, 1:18, and 1:20; and the thickness of the insulating layer is 50 μm-300 μm, such as 50 μm, 100 μm, 150 μm, 200 μm, 250 μm, and 300 μm. The ratio of the thickness of the bonding layer and the insulating layer is regulated to ensure the bonding effect between the insulating layer and the conductor.

The embodiments of the present disclosure further provide a coil, including the foregoing insulated wire. By utilizing the insulated wire provided by the embodiments of the present disclosure, the production cycle of the coil can be shorter, and at the same time the service life of the coil is improved.

The embodiments of the present disclosure provide an electronic/electrical device including the foregoing coil, and the specific type of the electronic device or electrical device is not limited.

The features and performance of the present disclosure are described in further detail below in connection with examples.

It needs to be noted that the conductor is low-oxygen copper or oxygen-free copper, and the copper size in Examples and Comparative Examples is selected as 2 mm×3 mm.

Example 1

The example provided a preparation method of the insulated wire, including the following steps.

(1) Preparing the Material.

The conductor was prepared; and the copper conductor was cleaned and dried to reserve.

The polyamide-imide resin was prepared, wherein PAI was an amorphous resin with a glass transition temperature above 200° C. and below 300° C., and a modulus of elasticity was 300 MPa-800 MPa.

The polyimide for the bonding layer was prepared, wherein a particle size was 15 μm~30 μm, and a glass transition temperature was 315° C.

The thermoplastic polyimide for the insulating layer was prepared, wherein a particle size was 2 mm; a glass transition temperature was 243° C.; and a melting point was 388° C. The thermoplastic polyimide particles were dried in vacuum at 200° C. for 5 h to reserve.

The organic solvent was prepared: N, N-dimethylacetamide (DMAC).

(2) Forming the Bonding Layer.

The bonding-layer mixed liquid was prepared below. The polyamide-imide resin was dissolved in the organic solvent, and heated and stirred to dissolve. The polyimide resin was added, and stirred to dissolve, so as to obtain the bonding-layer mixed liquid. The bonding-layer mixed liquid in mass percentage included: the polyamide-imide 25%, the polyimide 2%, and the organic solvent 73%.

The bonding layer was formed on the copper wire by performing the coating and curing process 4 times by using the bonding-layer mixed liquid, wherein a curing temperature after coating was 350° C., and a solvent content after each was controlled to be smaller than 200 ppm. The bonding layer with an average thickness of 10 μm was formed after the fourth curing.

(3) Forming the Thermoplastic Polyimide Insulating Layer.

The material obtained in step (2) was preheated by using the high-frequency induction heating method, wherein a heating power was controlled to be 5000 W; a frequency was 96 kHz; and a preheating temperature was 290° C. The material was placed in the extruder after preheating. The dried thermoplastic polyimide particle was added to the extruder after the extruder was vacuumed for 1 h; it was melted and extruded at 400° C.; it was held at 270° C. for 15 s after extruding under the negative pressure condition; and then it was cooled, wherein the vacuum suction for applying the negative pressure was controlled to be equal to 0.3 MPa. The insulated wire was obtained, and the thickness of the insulating layer was 130 μm.

Example 2

The example provided a preparation method of the insulated wire, including the following steps.

(1) Preparing the Material.

The thermoplastic polyimide with a particle size of 1 mm was prepared, and the other contents were the same as Example 1.

(2) Forming the Bonding Layer.

The bonding-layer mixed liquid was prepared below. The polyamide-imide resin was dissolved in the organic solvent, and heated and stirred to dissolve. The polyimide resin was added, and stirred to dissolve, so as to obtain the bonding-layer mixed liquid. The bonding-layer mixed liquid in mass percentage included: the polyamide-imide 30%, the polyimide 3%, and the organic solvent 67%.

The bonding layer was formed on the copper wire by performing the coating and curing process 3 times by using the bonding-layer mixed liquid, wherein the curing temperature after coating was 420° C., and the solvent content after each was controlled to be smaller than 200 ppm. The bonding layer with an average thickness of 8 μm was formed after the third curing.

(3) Forming the Thermoplastic Polyimide Insulating Layer.

The material obtained in step (2) was preheated by using the high-frequency induction heating method, wherein the heating power was controlled to be 4500 W; the frequency was 94 kHz; and the preheating temperature was 200° C. The material was placed in the extruder after preheating. The dried thermoplastic polyimide particle was added to the extruder after the extruder was vacuumed for 0.5 h; it was melted and extruded at 390° C.; it was held at 260° C. for 30 s after extruding under the negative pressure condition; and then it was cooled, wherein the vacuum suction for applying the negative pressure was controlled to be equal to 0.4 MPa. The insulated wire was obtained, and the thickness of the insulating layer was 120 μm.

Example 3

The example provided a preparation method of the insulated wire, including the following steps.

(1) Preparing the Material.

The thermoplastic polyimide with a particle size of 3 mm was prepared, and the other contents were the same as Example 1.

(2) Forming the Bonding Layer.

The bonding-layer mixed liquid was prepared below. The polyamide-imide resin was dissolved in the organic solvent, and heated and stirred to dissolve. The polyimide resin was added, and stirred to dissolve, so as to obtain the bonding-layer mixed liquid. The bonding-layer mixed liquid in mass percentage included: the polyamide-imide 20%, the polyimide 1%, and the organic solvent 79%.

The bonding layer was formed on the copper wire by performing the coating and curing process 5 times by using the bonding-layer mixed liquid, wherein the curing temperature after coating was 300° C., and the solvent content after each was controlled to be smaller than 200 ppm. The bonding layer with an average thickness of 12 μm was formed after the curing.

(3) Forming the Thermoplastic Polyimide Insulating Layer.

The material obtained in step (2) was preheated by using the high-frequency induction heating method, wherein the heating power was controlled to be 5500 W; the frequency was 100 kHz; and the preheating temperature was 320° C. The material was placed in the extruder after preheating. The dried thermoplastic polyimide particle was added to the extruder after the extruder was vacuumed for 2 h; it was melted and extruded at 410° C.; it was held at 280° C. for 10 s after the extrusion under the negative pressure condition; and then it was cooled, wherein the vacuum suction for applying the negative pressure was controlled to be equal to 0.5 MPa. The insulated wire was obtained, and the thickness of the insulating layer was 140 μm.

Example 4

The difference from Example 1 is that a plasma treatment step was added before the bonding layer was formed on the conductor. The details are as follows. The prepared conductor was preheated to 90° C. in a protective gas ($N_2$) environment; and the surface of the conductor was treated by argon plasma with a traveling speed of 10 m/min under a condition of an energy density of 8 A/cm$^2$, a pulse voltage of 225 V, a pulse frequency of 50 Hz, and a current of 10 A, wherein a residence duration of the conductor in the plasma treatment device was 0.05 s.

Example 5

The difference from Example 1 is only that the vacuum suction for applying the negative pressure in step (3) was controlled to be equal to 0.4 MPa.

Example 6

The difference from Example 1 is only that the vacuum suction for applying the negative pressure in step (3) was controlled to be equal to 0.5 MPa.

Comparative Example 1

The difference from Example 1 is only that the extrusion process was changed. The prior extrusion process was adopted without performing the vacuum extraction and the negative pressure, and it was extruded under the air atmosphere.

Comparative Example 2

The difference from Example 1 is only that the extrusion process was changed. The vacuum extraction and the negative pressure were not performed, and it was extruded under the nitrogen atmosphere.

Comparative Example 3

The difference from Example 1 is only that the vacuum suction for applying the negative pressure in step (3) was controlled to be equal to 0.2 MPa.

Comparative Example 4

The difference from Example 1 is only that the vacuum suction for applying the negative pressure in step (3) was controlled to be equal to 0.1 MPa.

Comparative Example 5

The difference from Example 1 is only that the bonding-layer mixed liquid did not contain the polyimide, and the polyimide was replaced with an equal amount of polyamide-imide.

Comparative Example 6

The difference from Example 1 is only that the content of each component in the bonding-layer mixed liquid was different, and the specific formulation was polyamide-imide 15%, polyimide 10%, and organic solvent 75%.

Comparative Example 7

The difference from Example 1 is only that the content of each component in the bonding-layer mixed liquid was different, and the specific formulation was polyamide-imide 10%, polyimide 15%, and organic solvent 75%.

Comparative Example 8

The difference from Example 1 is only that the preheating temperature of the material in step (3) was 180° C.

Comparative Example 9

The difference from Example 1 is only that the preheating temperature of the material in step (3) was 400° C.

Comparative Example 10

The difference from Example 1 is only that the extruding temperature in step (3) was 430° C.

Test Methods (1) On-Line Detection of Bubbles

The on-line detection of bubbles was performed on the insulated wire by using an on-line visual detection device, wherein the test method could be the visual inspection technology in the prior art or the method in the patent with application No. CN202310025492.9.

(2) Adhesion Test

The test was performed by using the adhesion test method provided by the test method 8 of IEC-60851-3 2019, and the specific steps were as follows.

The insulated wires of 300 mm obtained from Examples and Comparative Examples were taken as specimens respectively; the specimens were placed between two fixtures; the specimens and the fixtures were placed on the same axis; two ends were clamped; the specimens were stretched by 20% at a rate of 300 mm/min; and length of coating films of the specimens losing the adhesion was checked.

(3) Flexibility Test

The flexibility tests were performed on the insulated wires of Examples and Comparative Examples respectively according to the following method.

The flexibility test was performed by using the flexibility test method provided by the test method 8 of IEC-60851-3 2019, and the specific steps were as follows.

As shown in FIG. 1, two straight insulated wires with the length of 500 mm were taken. The two insulated wires were bent by 180±2° around a polished test axis core, wherein one was bent around its horizontal axis (the diameter of the axis core=2 times the thickness of the wire), and the other was bent around its vertical axis (the diameter of the axis=2 times the width of the wire). In the figure, "B" and "D" represent the width and thickness of the insulated wire respectively. In the test, after bending around its horizontal axis and its vertical axis, the product with a smooth surface and without cracks is recorded as "qualified", and the product with a cracked surface is recorded as "unqualified".

(4) Breakdown Voltage Test

The insulating breakdown voltage was tested by using the breakdown voltage method provided by the test method 13 of IEC-60851-5 2019, and the specific steps were as follows.

The insulating layer on one end of the insulated wire was removed; and it was put into a metal-steel-bead container with a thickness of 5 mm after bending on a wide edge of a round bar with a diameter of φ25 mm, wherein the end of the specimen should extend out for a sufficient length to avoid flashover. The test voltage was applied between the conductor and the metal steel bead; the voltage was risen at a boost speed of 500V/s and a leakage current of 5 mA; and it was tested for 5 times and the average value was taken as the insulating breakdown voltage.

TABLE 1

Properties of insulated wires obtained from Examples and Comparative Examples

| Group | Loss of adhesion (mm) | Flexibility test | Breakdown voltage (KV) | Amount of bubbles (PCS/100 m) | Max diameter Dmax (μm) |
|---|---|---|---|---|---|
| Example 1 | 1.7 | qualified | 16 | 0 | 29 |
| Example 2 | 1.5 | qualified | 13.9 | 0 | 26 |

TABLE 1-continued

Properties of insulated wires obtained from Examples and Comparative Examples

| Group | Loss of adhesion (mm) | Flexibility test | Breakdown voltage (KV) | Amount of bubbles (PCS/100 m) | Max diameter Dmax (μm) |
|---|---|---|---|---|---|
| Example 3 | 1.8 | qualified | 17.6 | 0 | 25 |
| Example 4 | 1.2 | qualified | 15.8 | 1 | 36 |
| Example 5 | 1.5 | qualified | 16 | 0 | 20 |
| Example 6 | 1.6 | qualified | 15.9 | 0 | 16 |
| Comparative Example 1 | 1.7 | unqualified | 8.9 | several | 139 |
| Comparative Example 2 | 1.8 | unqualified | 9.2 | several | 116 |
| Comparative Example 3 | 1.6 | qualified | 13.2 | several | 94 |
| Comparative Example 4 | 1.7 | qualified | 10.6 | several | 129 |
| Comparative Example 5 | 6.4 | unqualified | 15.9 | 1 | 44 |
| Comparative Example 6 | 5.6 | unqualified | 15.8 | 1 | 42 |
| Comparative Example 7 | 4.2 | unqualified | 15.5 | 1 | 40 |
| Comparative Example 8 | 6.6 | unqualified | 15.6 | 0 | 28 |
| Comparative Example 9 | 1.4 | unqualified | 13.9 | several | 46 |
| Comparative Example 10 | 1.5 | unqualified | 11.2 | several | 49 |

Notes:
"several" in Table 1 means that the amount of bubbles is larger than or equal to 50.

As can be seen from Table 1, the amount of bubbles of the insulated wires obtained from the Examples is significantly less; the diameter of bubbles is smaller; and tests of the length of losing adhesion and U-shaped bending test are both qualified.

It can be seen by comparing Example 1 and Comparative Example 1 that the extrusion under no negative pressure condition will results in larger and more bubbles; it can be seen by comparing Example 1 and Comparative Example 2 that the nitrogen protection is not obvious and cannot solve the bubble problem; it can be seen by comparing Example 1 and Comparative Examples 3 and 4 that the bubbles will be larger and more when the pressure is not enough; it can be seen by comparing Example 1 and Comparative Example 5 that the paint liquid bonding layer of the full PAI cannot bond with the TPI, and the adhesion is poorer; it can be seen by comparing Example 1 and Comparative Examples 6 and 7 that the adhesion between the bonding layer and the conductor will reduce when the PAI content is too low; as can be seen by comparing Example 1 and Comparative Example 8 that the adhesion will be poorer when the preheating temperature is too low; it can be seen by comparing Example 1 and Comparative Example 9 that the amount of bubbles will increase when the preheating temperature is too high; and it can be seen by comparing Example 1 and Comparative Example 10 that the amount of bubbles will increase when the extruding temperature is too high.

The foregoing is merely preferred embodiments of the present disclosure and is not intended to limit the present disclosure, and the present disclosure has various modification changes for those skilled in the art. Any modifications, equivalent substitutions, and improvements, etc., made within the spirit and principles of the present disclosure shall be included in the scope of protection of the present disclosure.

The invention claimed is:

1. A preparation method of an insulated wire, comprising:
preparing a core material that includes forming a bonding layer on a conductor, wherein a process of forming the bonding layer comprises: mixing polyamide-imide, polyimide, and organic solvent to obtain a bonding-layer mixed liquid, and performing coating and curing multiple times on the conductor by using the bonding-layer mixed liquid, wherein in mass percentage, the bonding-layer mixed liquid comprises: the polyamide-imide 20%-30%, the polyimide 1%-3%, and the organic solvent 67%-79%; and
preparing an insulating layer that includes adding thermoplastic polyimide particles to an extruder after the extruder is vacuumed first; melting and extruding at an outer side of the core material after preheating; holding at 260° C.-280° C. for 10 s-30 s after the extruding; and then cooling, so as to form a thermoplastic polyimide insulating layer, wherein the extruding is carried out under a negative pressure condition; a vacuum suction for applying the negative pressure is controlled to be larger than or equal to 0.3 MPa; a preheating temperature during the preheating is controlled to be 200° C.-320° C.; and an extruding temperature during the extruding is 370° C.-410° C.

2. The preparation method according to claim 1, wherein a vacuuming duration of the extruder is controlled to be 30 min-120 min, and a volume fraction of oxygen in the extruder after the vacuuming duration is smaller than or equal to 3%.

3. The preparation method according to claim 1, wherein after drying, the thermoplastic polyimide particles are fed into the extruder under a sealing condition, wherein
a particle size of the thermoplastic polyimide particles is 1 mm-3 mm, and
a glass transition temperature of the polyimide in the bonding layer is larger than a glass transition temperature of the thermoplastic polyimide in the insulating layer, wherein the glass transition temperature of the polyimide in the bonding layer is 315° C.-335° C., and the glass transition temperature of the thermoplastic polyimide in the insulating layer is 235° C.-255° C.

4. The preparation method according to claim 1, wherein the preheating is to heat the core material by adopting a high-frequency induction heating method in an inert gas, wherein a heating power is controlled to be 4500 W-5500 W, and a frequency is 90 kHz-100 kHz.

5. The preparation method according to claim 1, wherein a curing temperature is controlled to be 250° C.-450° C. after each coating of the bonding layer, and a solvent content is controlled to be smaller than 200 ppm after curing.

6. The preparation method according to claim 1, wherein a thickness of a coating film formed after each coating of the bonding layer and curing is controlled to be 2 μm-4 μm, and a thickness of a final formed bonding layer is 5 μm-30 μm.

7. The preparation method according to claim 6, wherein a ratio of the thickness of the bonding layer to a thickness of the insulating layer is 1:(10-20).

8. The preparation method according to claim 7, wherein a section of the conductor is rectangular, and the thickness of the insulating layer is 50 μm-300 μm.

9. The preparation method according to claim 1, wherein a material of the conductor is selected from at least one of copper, aluminum, copper alloy, and aluminum alloy.

* * * * *